N. LAWRENCE.
Coffee Pot.
No. 91,754. Patented June 22, 1869.
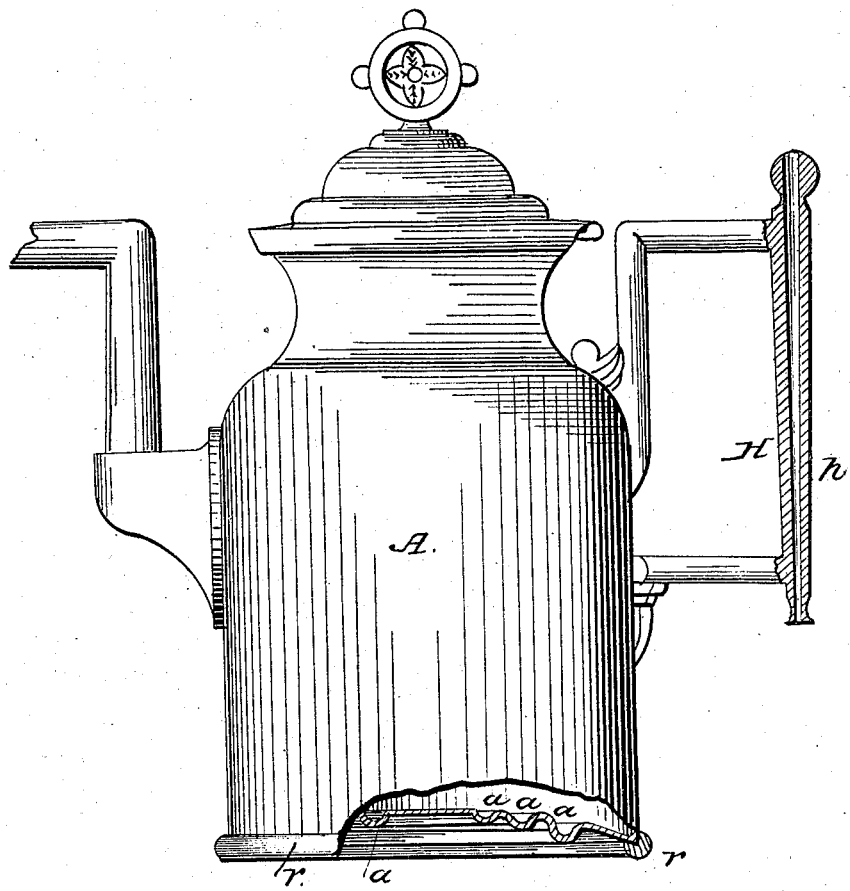
Witnesses
C. A. Pettit
S. C. Kemon
Inventor
N. Lawrence
by Munn & Co
Attorneys

United States Patent Office.

NATHAN LAWRENCE, OF TAUNTON, MASSACHUSETTS, ASSIGNOR TO REED AND BARTON, OF SAME PLACE.

Letters Patent No. 91,754, dated June 22, 1869.

IMPROVEMENT IN COFFEE-POT.

The Schedule referred to in these Letters Patent and making part of the same.

*To all whom it may concern:*

Be it known that I, NATHAN LAWRENCE, of Taunton, in the county of Bristol, and State of Massachusetts, have invented a new and improved Tea and Coffee-Pot; and I do hereby declare that the following is a full, clear, and exact description of the construction and operation of the same, reference being had to the accompanying drawings, making a part of this specification, in which my invention is represented by a side view, a portion of the wall being broken away, and a portion of the handle being shown in section.

This invention relates to metallic tea and coffee-pots, and consists of an improved handle, which will not become so quickly heated as the handles heretofore made for such articles, together with an improved construction of the bottom, to prevent it from melting, and an improvement in the method of forming the body of the pot.

In the drawing—

A is the body of the coffee and teapot, provided with a handle, H, the latter being made rectangular in shape, and the outer portion thereof, which is grasped in lifting the pot, being provided with the vertical tubular passage $h$, from end to end.

This tubular construction not only diminishes the conduction of the heat, but allows the air to circulate freely through and cool the handle.

The pot is made of the common soft metals or alloys, in use for that purpose, and its side walls and bottom are struck up in a single piece, the bottom being concave on the under side, so that when set on a heated stove, only its rim shall come in contact with the same, and being provided with a series of corrugations, $a\ a$, concentric with it, for the purpose of increasing the surface, both outside and inside, and proportionately, its heat-conducting capacity.

Having thus formed the bottom, I attach around its rim, by any solder that will not yield readily to heat, a ring or shoe, $r$, of some hard, nearly infusible metal, or other refractory substance, on which the pot sits, and which alone comes in contact with the heated surface of the stove.

The spout and cover are then attached, and the outer surface of the walls is finished, plated, &c., after which the instrument is ready for use.

The refractory shoe or ring which I attach to the bottom of the pot, is not in the form of a flange extending downward from the edge of the vessel, but is simply a hard-metal ring, grooved or rebated around its inner surface, so as to form a socket into which the pot will fit nicely, as shown in the drawing, and attached after the rest of the pot is finished.

By this means I produce, at a comparatively slight expense, a handsome and durable coffee and teapot, which can be conveniently handled when filled with boiling liquids, and the bottom of which will not melt down, although its rim is in contact with a very hot surface.

Having thus described my invention,

What I claim as new, and desire to secure by Letters Patent, is—

1. In a coffee or teapot made of the ordinary soft metal, fusible at low temperatures, the application of the ring $r$, of refractory material, when constructed in the form and attached in the manner described, and for the purpose set forth.

2. In a coffee or teapot, making the bottom concave on the under side, and providing it with a series of circular concentric corrugations, $a\ a$, as described, and for the purpose specified.

NATHAN LAWRENCE.

Witnesses:
GEORGE BRABROOK,
CALVIN P. HARRIS.